United States Patent
Dotan-Cohen et al.

(10) Patent No.: US 11,128,979 B2
(45) Date of Patent: Sep. 21, 2021

(54) INFERRING USER AVAILABILITY FOR A COMMUNICATION

(71) Applicant: MICROSOFT TECHNOLOGY LICENSING, LLC, Redmond, WA (US)

(72) Inventors: Dikla Dotan-Cohen, Herzliya (IL); Ido Priness, Herzliya (IL); Haim Somech, Ramat Gan (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/700,085

(22) Filed: Dec. 2, 2019

(65) Prior Publication Data

US 2020/0107152 A1 Apr. 2, 2020

Related U.S. Application Data

(63) Continuation of application No. 14/811,220, filed on Jul. 28, 2015, now Pat. No. 10,516,964.

(51) Int. Cl.
*H04W 4/021* (2018.01)
*H04W 24/02* (2009.01)
(Continued)

(52) U.S. Cl.
CPC .......... *H04W 4/021* (2013.01); *G06Q 10/10* (2013.01); *H04M 1/72454* (2021.01);
(Continued)

(58) Field of Classification Search
CPC ......... H04M 1/72572; H04M 1/72569; H04M 1/72577; H04M 1/72563; H04M 1/72566;
(Continued)

(56) References Cited

U.S. PATENT DOCUMENTS

2011/0044431 A1* 2/2011 Klemm ............... H04M 1/724
379/32.01
2012/0157127 A1* 6/2012 Ferren ............... H04N 13/239
455/456.6

FOREIGN PATENT DOCUMENTS

CN 104052858 A 9/2014
CN 104427075 A 3/2015
CN 104683970 A 6/2015

OTHER PUBLICATIONS

"Office Action Issued in European Patent Application No. 16745012.1", dated Nov. 5, 2020, 8 Pages.
(Continued)

*Primary Examiner* — Nam T Huynh
(74) *Attorney, Agent, or Firm* — Shook, Hardy & Bacon L.L.P.

(57) ABSTRACT

The technology described herein manages communications received by a mobile computing device by ascertaining a user's availability to receive an incoming communication. The technology described herein can optimize the use of notification resources on a computing device to provide notifications only when a user is available to respond to a communication the notification announces. The user's availability to receive a communication can be inferred through the analysis of signal data that describes a present context of the mobile device and/or the mobile device's user. Upon determining a present level of availability, the technology described herein can take several different actions. The actions include generating an alternative notification for a newly received communication, generating no notification for a newly received communication, and communicating an automated "not available" message to the originator of a newly received communication.

20 Claims, 6 Drawing Sheets

(51) Int. Cl.
*G06Q 10/10* (2012.01)
*H04M 1/72454* (2021.01)
*H04M 1/72457* (2021.01)
*H04M 3/42* (2006.01)
*H04W 4/16* (2009.01)
*H04M 1/72463* (2021.01)

(52) U.S. Cl.
CPC ... *H04M 1/72457* (2021.01); *H04M 3/42365* (2013.01); *H04W 24/02* (2013.01); *H04M 1/72463* (2021.01); *H04W 4/16* (2013.01)

(58) Field of Classification Search
CPC ..... H04M 2203/4536; H04M 3/42365; H04M 1/72457; H04M 1/72454; H04M 1/72463; H04M 3/42382; H04M 1/72448; H04M 2242/14; H04W 4/02; H04W 4/021; H04W 4/12; H04L 51/04; H04L 51/063; H04L 51/066; H04L 51/20
See application file for complete search history.

(56) References Cited

OTHER PUBLICATIONS

"First Office Action and Search Report Issued in Chinese Patent Application No. 2016800440827", dated Jun. 3, 2021, 12 Pages.

\* cited by examiner

INFERRING USER AVAILABILITY FOR A COMMUNICATION

RELATED APPLICATIONS

This application is a continuation of U.S. application Ser. No. 14/811,220, filed Jul. 28, 2015, titled "INFERRING USER AVAILABILITY FOR A COMMUNICATION," which is incorporated herein by reference in its entirety.

BACKGROUND

Advanced computer and communication systems have transformed many important aspects of human and computer interactions. Existing communication modes include e-mail, voice mail, text message, phone call, social media message, and such. Different communication modes require different levels of availability for the recipient to interact with the communication. For example, a user that is driving a car may not (or should not) be able to read a text message and type a response. On the other hand, the user may be able to receive a phone call.

The receiving device is currently unable to communicate an availability of the user based on the recipient's present context. Current automated responses, such as automated out-of-the-office messages, provide some level of information to the recipient, but do not actually let the sender know whether the user received the message or suggest alternative communication modes that would work in the recipient's present context. For example, an out-of-office message might suggest calling the user's cell phone, without regard to whether the user is currently available to receive a call. The receiving computer is also unable to determine the urgency of a message and determine whether the recipient should be interrupted given the recipient's present context. The computing device can also let an originator of a communication know when the user is next going to be available to receive the original form of communication.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein manages communications received by a mobile computing device by ascertaining a user's availability to receive an incoming communication. A user may have different availability for different communication modes. For example, a user may be available to receive a phone call, but not able to read a text message or may not prefer to read a next message. As used herein, "not available" may express a user's communication preference not to communicate given the context, rather than an impossibility to communicate. For example, a groom may prefer not to answer his phone during his wedding, though answering the phone is possible, in theory.

The technology described herein can optimize the use of notification resources on a computing device to provide notifications only when a user is available to respond to a communication the notification announces. The user's availability to receive a communication can be inferred through the analysis of signal data that describes a present context of the mobile device and/or the mobile device's user. In particular, the signal data can be used to identify a geographic location for the mobile device. The geographic location can then be tied to a venue, such as a home or business. Communication data at the venue can be analyzed to find communication patterns that can be used to determine a present communication context. Semantic information about the venue can also be used to further define a present context.

Upon determining a present level of availability, the technology described herein can take several different actions. The actions include generating a normal notification for a newly received communication, generating an alternative notification for a newly received communication, generating no notification for a newly received communication, communicating an automated "not available" message to the originator of a newly received communication, transcribing the newly received communication into a different mode the user is available to receive, and notifying the originator when the user is next going to be available to receive the newly received communication. For example, the sender of a text message could receive an automated response indicating that the user is presently unavailable to review text messages but could receive a phone call. In another aspect, the user may not be able to receive a phone call, in which case the phone call could be answered by the computing device. The computing device could let the caller know through an audible message that the user is not available to receive a phone call but could receive a text message. Further, the automated answering service could transcribe a voicemail and automatically communicate the voicemail content to the user as a text message.

BRIEF DESCRIPTION OF THE DRAWINGS

Aspects of the technology described herein are described in detail below with reference to the attached drawing figures, wherein.

DETAILED DESCRIPTION

Figure 1:
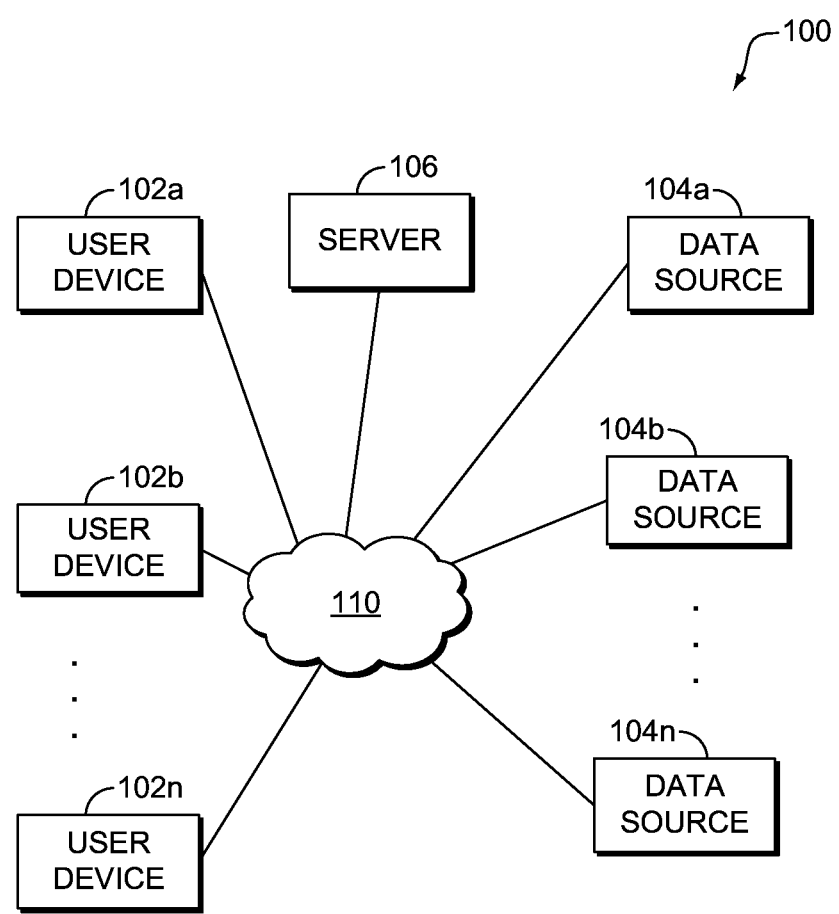
FIG. 1 is a block diagram of an example operating environment suitable for implementing aspects of the technology described herein.

The subject matter of aspects of the technology described herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein manages communications received by a mobile computing device by ascertaining a user's availability to receive an incoming communication. A user may have different availability for different communication modes. For example, a user may be available to receive a phone call, but not able to or want to read a text message. As used herein, "not available" may express a user's communication preference not to communicate given the context, rather than an impossibility to communicate. For example, a groom may prefer not to answer his phone during his wedding, though answering the phone is possible, in theory. The technology described herein can optimize the use of notification resources on a computing device to provide notifications only when a user is available to respond to a communication the notification announces. The user's availability to receive a communication can be inferred through the analysis of signal data that describes a present context of the mobile device and/or the mobile device's user. In particular, the signal data can be used to identify a geographic location for the mobile device. The geographic location can then be tied to a venue, such as a home or business. Communication data at the venue and the current communication state of other devices at the venue can be analyzed to find communication patterns that can be used to determine a present communication context. The communication data can include: user behavior in this venue in similar context (e.g., similar day and time), user behavior in this venue (overall), aggregated data in this venue from multiple users in a similar context, aggregated data in this venue, and aggregated data in venues similar to this one. Similar venues may be those assigned to the same category. For example, different schools may be in the same venue category and considered similar. Semantic information about the venue can also be used to further define a present context.

Upon determining a present level of availability, the technology described herein can take several different actions. The actions include generating a normal notification for a newly received communication, generating an alternative notification for a newly received communication, generating no notification for a newly received communication, communicating an automated "not available" message to the originator of a newly received communication, transcribing the newly received communication into a different mode the user is available to receive, and notifying the originator when the user is next going to be available to receive the newly received communication. For example, the sender of a text message could receive an automated response indicating that the user is presently unavailable to review text messages but could receive a phone call. In another aspect, the user may not be able to receive a phone call, in which case the phone call could be answered by the computing device. The computing device could let the caller know through an audible message that the user is not available to receive a phone call but could receive a text message. Further, the automated answering service could transcribe a voicemail and automatically communicate the voicemail content to the user as a text message.

The technology described herein can determine whether to provide a notification when a communication is received and, if a notification is provided, what notification is appropriate. As used herein, a notification proactively provides information to the user. The user does not need to navigate to an interface to receive the notification. For example, a list of e-mails in an inbox interface is not a notification. An icon on the lock screen indicating an e-mail has been received is a notification because the user does not need to open an interface to see the notification. Notifications can be non-interruptive or interruptive. An interruptive notification will be apparent to the user whether or not the user is currently interacting with his device. For example, audible sounds and vibrations are interruptive. A non-interruptive notification can include an icon, pop-up interface, or other visible indication noticeable only when the user is looking at their computing device.

Additionally, the technology described herein can determine when the user may be available to receive a communication in the particular mode and provide a response indicating when the user will be available. The user's availability to receive a communication in a particular communication mode can be inferred. In one instance, the user does not provide explicit instructions regarding availability. For example, the user may not have provided an out-of-office message or automated e-mail response. Further, the user may not have any particular calendar entries or explicit computerized indication that the user is unavailable. Instead, the technology described herein can analyze signal data, such as the user's location, the user's interactions with a mobile computing device, past communication patterns, and such, to infer when the user will be available. For example, if the signal data indicates that the mobile device is located at a gym and an analysis of past usage data indicates that the user does not respond to any form of communication when previously at the gym, then the user's non-availability while at the gym may be inferred. Further, if the user generally spends one hour at the gym, then the user's next availability to communicate can be inferred as one hour from when the mobile device arrived at the gym.

The technology described herein can determine a user's availability using contextual information. The contextual information can include communication patterns received from other mobile communication devices. The communication records can be associated with a venue and a time. For example, the communication records of a large plurality of users could be analyzed to determine what modes of communication are most common in a given context, such as between 9 AM and 10 AM on Tuesday at a school. The analysis of communication signals may reveal that different communication modes are common at different times. For example, students may not use mobile phones while school is in session. An analysis of the communication records for a plurality of students at the school may indicate that few communications occur during the school day, but shortly after school ends communications occur frequently. A corresponding change in notification status (e.g., ringer turned on) could correspond with the increase in communications. The above data could be analyzed to conclude a user at the school during school hours is not available to communicate, but is available after school is out. Accordingly, contextual availability for communications can have both a location and a time period component.

Contextual availability can be based on usage patterns generated from a large plurality of users but can also be tailored to individual users. For example, the analysis of communication data from a plurality of mobile devices may cause various venues to be designated to make the users contextually unavailable when present. However, if an individual user nevertheless actively receives or initiates communications in one or more modes while at venues that are similarly designated as contextually unavailable, then the communication modes on the mobile device for this particular user may be set to available.

In addition to location and time, a user's activities on a mobile device may be used to automatically determine availability. For example, a user playing games on a mobile device may not answer the phone while playing the game. On the other hand, the user may respond to text notifications. In this sort of usage pattern, the technology described herein may automatically intercept incoming phone calls and provide a notification that the user is unavailable to receive a phone call presently, but that the user may be contacted through a text message. As mentioned previously, an aspect of the technology can also transform one communication mode to another mode, for example, by transcribing a voicemail message into a text message that is communicated to the user's text address.

Some communications are more important than others. The technology described herein can recognize urgent communications and provide automated responses only when the communication is determined to be urgent. The urgency of a communication can be ascertained from semantic knowledge about the user as well as previous communication patterns. For example, the user may ignore phone calls from social contacts, but answer the phone calls from professional contacts, such as co-workers. Given this pattern, automated responses may be sent to co-workers, but not social contacts when the user is unavailable for phone communication.

Additionally, a privacy analysis may determine exactly what information is provided in an automated response. For example, users may not wish for availability information to be shared with the originators of every type of communication. Instead, the users may wish to provide availability information to co-workers and close family associates, but not social contacts. Alternatively, the information provided in an automated response can vary based on the day of the week and the time of the day. For example, availability information may be shared with co-workers only during working hours. Availability information may be shared with social contacts during non-working hours.

The user can be provided an interface to opt-in or opt-out of a service that automatically provides availability information. In addition, the user may be given a chance to opt-in or opt-out of the collection and sharing of usage data. The sharing of communication data can be performed in a manner that protects the user's identify. For example, a communication record may be generated that shows a time and place for a communication, but not the communicating parties.

In certain respects, aspects of the present disclosure relate to using a venue to help determine the current communication context. The term "venue" is used broadly herein to include nearly any entity with a geographic location. By way of example and not limitation, a venue may include a business, school, organization, club, and physical place or location (such as a park, stadium, or facility). The venues may be categorized to help determine a communication context when little or no data for a specific venue is available. For example, a venue category may be a school, religious organization, or chain of stores, where each franchise in the chain is in the same category. The venues may also be associated with semantic information, such as a home location, place of work, gym, friend's place, etc.

In some aspects, venue logic or semantic information about geographic locations visited by the user may be used to determine likely venues at locations where more than one venue is present, such as a school that is adjacent to a movie theater. For example, where user data indicates that the user likely has a 10-year-old daughter and that the user has a pattern of visiting the same location every morning at 7:45 AM and every afternoon at 3:00 PM, but the location includes a school and a theater, it may be determined that the venue of interest to the user is more likely the school. Additionally, in some cases, a user may explicitly indicate that a particular venue is important.

Additionally, some aspects of the technology may be carried out by a personal assistant application or service, which may be implemented as one or more computer applications, services, or routines, such as an app running on a mobile device or in the cloud, as further described herein.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102*a* and 102*b* through 102*n*; a number of data sources, such as data sources 104*a* and 104*b* through 104*n*; server 106; and network 110. It should be understood that environment 100 shown in FIG. 1 is an example of one suitable operating environment. Each of the components shown in FIG. 1 may be implemented via any type of computing device, such as computing device 600 described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102*a* and 102*b* through 102*n* can be client devices on the client-side of operating environment 100, while server 106 can be on the server-side of operating environment 100. The user devices can send and receive communications. A combination of communication records generated from the user devices can be analyzed to find usage patterns that can be used to inform current availability to receive a communication. Server 106 can comprise server-side software designed to work in conjunction with client-side software on user devices 102*a* and 102*b* through 102*n* so as to implement any combination of the features and functionalities discussed in the present disclosure. For example, the server 106 may run an availability engine, such as engine 280, that determines the communication context of a particular venue. The server 106 may receive communication records from the user devices. This division of operating environment 100 is provided to illustrate one example of a suitable environment, and there is no requirement for each implementation that any combination of server 106 and user devices 102*a* and 102*b* through 102*n* remain as separate entities.

User devices 102*a* and 102*b* through 102*n* may comprise any type of computing device capable of use by a user. For example, in one aspect, user devices 102*a* through 102*n* may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one aspect, one or more data sources 104a through 104n provide (or make available for accessing) user data to user-data collection component 214 of FIG. 2.) Data sources 104a and 104b through 104n may be discrete from user devices 102a and 102b through 102n and server 106 or may be incorporated and/or integrated into at least one of those components. In one aspect, one or more of data sources 104a though 104n comprise one or more sensors, which may be integrated into or associated with one or more of the user device(s) 102a, 102b, or 102n or server 106. Examples of sensed user data made available by data sources 104a though 104n are described further in connection to user-data collection component 214 of FIG. 2. The data sources 104a though 104n can comprise a knowledge base that stores information about a venue, a user, or other entity related to a particular communication.

Figure 2:
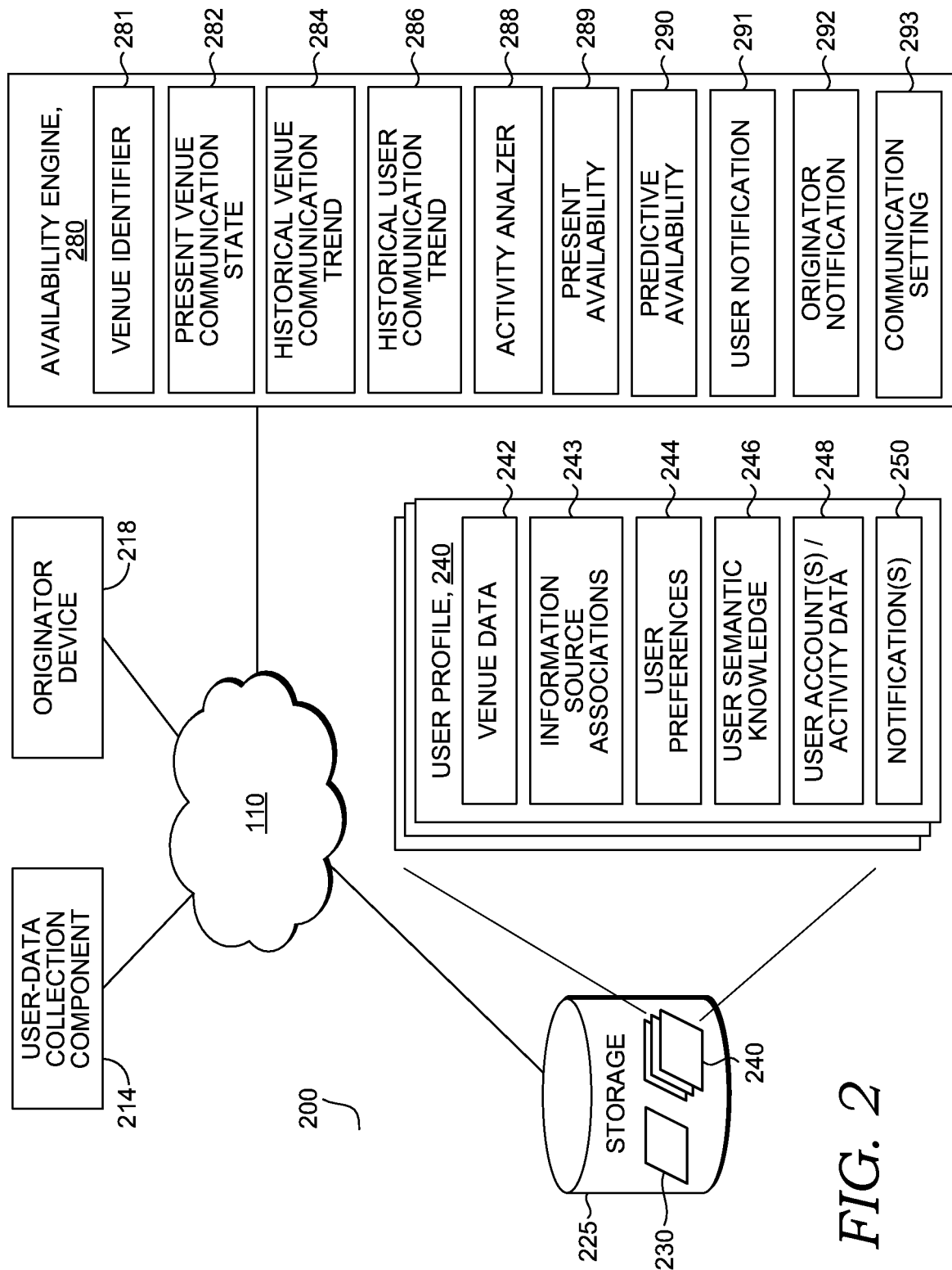
FIG. 2 is a diagram depicting an example computing architecture suitable for implementing aspects of the technology described herein.

Operating environment 100 can be utilized to implement one or more of the components of system 200, described in FIG. 2, including components for collecting user data, monitoring events, generating communication notifications, determining user availability, and/or presenting notifications and related received communications to users at a contextually appropriate intrusiveness level.

Referring now to FIG. 2, with FIG. 1, a block diagram is provided showing aspects of an example computing system architecture suitable for implementing an aspect of the technology described herein and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 214, availability engine 280, originator device 218, and storage 225. Availability engine 280 (including its components 281, 282, 284, 286, 288, 289, 290, 291, 292, and 293), user-data collection component 214, and originator device 218 may be embodied as a set of compiled computer instructions or functions, program modules, computer software services, or an arrangement of processes carried out on one or more computer systems, such as computing device 600 described in connection to FIG. 6, for example.

In one aspect, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some aspects, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects functionality of these components can be shared or distributed across other components.

Continuing with FIG. 2, user-data collection component 214 is generally responsible for accessing or receiving (and in some cases also identifying) user data from one or more data sources, such as data sources 104a and 104b through 104n of FIG. 1. In some aspects, user-data collection component 214 may be employed to facilitate the accumulation of user data of one or more users (including crowdsourced data) for availability engine 280. The data may be received (or accessed), and optionally accumulated, reformatted, and/or combined, by user-data collection component 214 and stored in one or more data stores such as storage 225, where it may be available to availability engine 280. For example, the user data may be stored in or associated with a user profile 240, as described herein. In some aspects, any personally identifying data (i.e., user data that specifically identifies particular users) is either not uploaded from the one or more data sources with user data, is not permanently stored, and/or is not made available to availability engine 280.

User data may be received from a variety of sources where the data may be available in a variety of formats. For example, in some aspects, user data received via user-data collection component 214 may be determined via one or more sensors, which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and e-mails; website posts; other user data associated with communication events; etc.) including user activity that occurs over more than one user device, user history, session logs, application data, contacts data, calendar and schedule data, notification data, social network data, news (including popular or trending items on search engines or social networks), online gaming data, e-commerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, cellular network, or IP address data), and nearly any other source of data that may be sensed or determined as described herein. In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an e-mail account, a credit card account, or other data sources. In some aspects, user-data collection component 214 receives or accesses data continuously, periodically, or as needed.

The originator device 218 can originate communications that are sent to a user device. In one aspect, the user's availability is determined upon receiving a message. Alternatively, the user's availability is periodically determined apart from any communications. The originator device 218 may be the recipient of a notification generated in response to a communication received by a user device.

At a high level, aspects of availability engine 280 may determine, from the user data, whether or not a user is presently available to receive a communication. If not available, the availability engine 280 can generate customized responses that are communicated to an originator of a communication. The response can provide additional information related to the user's communication status, such as when the user will next be available to receive a communication. In one aspect, signal data associated with venues is used to determine a user's availability. Venue data for a set of venues, and user-related activity patterns, or interactions associated with the venues, or other user venue-related data may be stored as user-relevant venue data 242 of user profile 240. Information sources for the venues may be identified and information provided by these sources may be analyzed for relevance to the user and/or communication availability. For example, event information associated with a venue may be extracted and stored to predict availability to receive communications. When the user is present at a venue during an event, then availability may be determined to be after the event concludes.

The availability engine 280 includes several subcomponents. The subcomponents include venue identifier 281, present venue communication state component 282, historical venue communication trend component 284, historical user communication trend component 286, activity analyzer 288, present availability component 289, predictive availability component 290, user notification component 291, originator notification component 292, and communication setting component 293. The availability engine 280 and the functions associated therewith maybe distributed across the system 200. For example, the components could be distributed between servers and a client device, such as a smartphone. In some aspects, availability engine 280 and/or one or more of its subcomponents may determine interpretive data from received user data. Interpretive data corresponds to data utilized by the subcomponents of availability engine 280 to interpret user data. For example, interpretive data can be used to provide context to user data, which can support determinations or inferences made by the subcomponents. Moreover, it is contemplated that aspects of availability engine 280 and its subcomponents may use user data and/or user data in combination with interpretive data for carrying out the objectives of the subcomponents described herein.

The venue identifier 281 can determine that a mobile device is currently located within a particular venue. Data associated with the venue can then be analyzed to determine the user's current communication context. As an input, the venue identifier 281 receives location data from a mobile computing device and determines that the mobile computing device is currently located in a venue, such as a restaurant, church, synagogue, school, hospital, etc. The venue identifier 281 can identify a venue by matching the location data to a data record that associated venues with locations.

In some instances, venue disambiguation may be performed by the venue identifier to determine in which of several nearby venues the user is actually in. For example, the GPS information may be accurate enough to determine that a mobile device is located within a mall but not able to pinpoint the location to a specific store in a mall. The venue disambiguation performed by the venue identifier 281 may select a particular store that the user is likely to have an interest in based on semantic data known about the user. For example, a male user may be more likely to be in a shoe store instead of an adjacent hair salon catering to women.

The venue identifier 281 can associate a venue with communication records that are generated by the user or other users. A communication record can include a mode of communication along with a date and time of the communication. Other information such as the communication participants, such as an originator or a recipient of the communication, can be included. The communication record can also include a notification state for a communication device when in the venue. For example, the notification state could indicate the ringtone is set to mute.

Venue identifier 281, in general, is responsible for determining venues associated with a geographic location. In some aspects, venue identifier 281 identifies a set of venues by monitoring user data for venue-related information, such as GPS data. Venues may be inferred using an inference engine and analyzed for relevance to a user (such as using activity analyzer 288, described herein) based on, for example, the association of user data with the venue-related data. By way of example, venues may be inferred by analyzing user data (including interpretive data) for venue-related information, such as user location activity indicating patterns of visiting geographic locations corresponding to venue locations or online activity such as websites or social media pages visited by a user, communications associated with venues (such as e-mails received from a business or school), purchase history, or combinations of these. In some cases, venues may be identified using a knowledge base (such as a semantic knowledge base) of venues or entities associated with data features observed in user data, such as venues associated with geographic locations, domains of websites or e-mails, phone numbers, etc. In some aspects, similar methods may be utilized by search engines to identify entities that may be relevant to a user based on user search queries and/or user search history.

In some aspects, venue variables related to communications may be tracked (such as monitored and/or stored) by venue identifier 281. In particular, values corresponding to tracked venue variables may be stored in association with a user, for example, with respect to a corresponding one of user profiles 240, in venue data 242. Tracked variables can correspond to any of a variety of user data, examples of which have been described above and include sensor data or readings, which may be sensed by one or more sensors (such as information associated with a user device regarding location, position, motion/orientation, user-access/touch, connecting/disconnecting a charger, user activity on the user device, or other information that may be sensed by one or more sensors, such as sensors found on a mobile device), GPS coordinate samples, and many more. It will be appreciated that values of tracked variables may be associated with one or more venues and/or user activity and need not be venue specific. An example of a tracked variable is a time stamp corresponding to a respective instance of a user being present at a venue. The time stamp can indicate the relative order or sequence of communications and/or device state changes that occurred while at the venue, and/or just before arriving, and/or just after leaving a venue. Relevant device state information includes muting or altering a notification setting. The types of communications initiated or participated in while at the venue can be used to form a corresponding routine or pattern, as further described below.

As a further example, interaction with a venue may comprise data indicating a user visiting a store. One tracked variable may correspond to an arrival location, such as an arrival location name. In detecting the venue, venue identifier 281 may infer the arrival as being satisfied based on user data comprising GPS data on the user's phone (e.g., user device 102a of FIG. 1), wherein the arrival location name is identified as a store and stored based on interpretive data that includes map data used to associate coordinates from the user's phone with a corresponding location name Thus, for one instance, the arrival location name may be "Walmart," and for another instance, the arrival location name may be "Target," as examples. However, it will be appreciated that the level of granularity in the detection and tracking of potential user interactions with venues can vary. Other examples of potential tracked variables, or more generally venue variables, include arrival time (e.g., a time stamp), arrival location coordinates, visit duration, routes or sequences of locations, and many more.

Venue identifier 281 may search and/or analyze user data for any of a variety of venue-related data including venue variables. By matching user data to one or more venues and/or venue variables thereof, venue identifier 281 may detect venues and identify relevant venues from patterns of detected venue interaction for users; for example, venue interactions indicating a pattern, such as the user visiting a grocery store every Wednesday night. Although several examples of how venue identifier 281 may make such determinations are described herein, many variations of venue identification and venue-variable monitoring are possible in various aspects of the technology described herein.

The present venue communication state component 282 can ascertain the communication state of other computing devices presently co-located in the venue. In one instance, the component 282 ascertains the contextual communication state of a venue when a user enters a new venue. The communication state may be updated periodically. In one aspect, mobile devices periodically provide state information to a centralized data collection source, such as user-data collection component 214. The component 282 can access the centralized data source to find state information associated with other communication devices presently within the venue. The communication devices can include phones, tablets, headsets, and such. The communication state can describe a notification volume, such as a ringtone volume, and other communication states. The present venue communication state component 282 can also receive recent communication activity, such as records of recent communications. These records can be analyzed to determine a prevailing notification pattern. The prevailing pattern can be an input into determining whether or not a particular user is presently available to communicate and/or receive a notification.

The present venue communication state component 282 can determine a present communication context for the venue. The present communication context for the venue describes a degree of communication and sensitivity to notifications based on phone or communication device settings for devices in the venue. For example, the present communication context may be "not available" for calls if above a threshold percentage of other users in the venue have their ringtones muted or set to vibrate. Similarly, an analysis of communications that indicate nearby users are not making phone calls or making very few phone calls can indicate that the context suggests that phone calls should not be made. For example, the users may be in a school, library, or religious facility that discourages people to cause a disruption by making or receiving a phone call.

Similarly, the analysis of communication records may show that nearby devices are sending and receiving text messages indicating that the user's present context indicates availability for text messages. The final output of the present venue communication state component 282 could be a present communication context that indicates whether different communication modes are available. It should be noted that the communication records for individual devices located in the venue may be compared against historical trends for those devices. A significant change in communication patterns when present in a venue can be a strong signal. For example, a device that receives frequent communications when outside of the venue but no communications when inside the venue generates a strong signal that the context should be not available for communication.

The historical venue communication trend component 284 can establish a historical communication context for a venue. The historical context may be broken into different time periods. For example, a venue may have a communication context in the morning that differs from the communication context in the afternoon. A school is one example of such a venue that may have varying communication contexts at different times of day. When school is in session, the communication context may indicate no availability for communications. On the other hand, when school is out of session, the communication context could be available for all forms of communication. Component 284 can analyze historical communication records generated when devices of the user and/or other users were at the venue to ascertain a pattern. The pattern can be an input to determine present availability.

The school example also illustrates that the communication context can vary from person to person even within the same venue. For example, teachers may be available for communications in a school, at least on a limited basis, while students are not available. The historical venue communication trend component 284 can analyze the communications occurring with different users at different times of day while in the venue to find patterns that can be used to predict the present availability. For example, if the historical trend indicated that users do not make communications while in the venue between 9 and 10 AM in the morning, then the historical venue communication trend component 284 could output a "not available for communication" finding between 9 and 10 AM. The component 284 can identify different trends within different communication modes to determine whether the people historically are available for different communication modes while in the venue.

Example approaches are described below, where each instance of a communication record associated with a venue has corresponding historical values of tracked variables that form patterns, and component 284 may evaluate the distribution of the tracked variables for patterns. In the following example, a tracked variable for a communication is a time stamp corresponding to an instance of the communication in the venue. However, it will be appreciated that, conceptually, the following can be applied to different types of historical values.

A bag of time stamps (i.e., values of a given tracked variable) can be denoted as $\{t_m\}_{m=1}^{M}$, and mapped to a two-dimensional histogram of hours and days of the week. The two-dimensional histogram can comprise a summation over the instances of the communication records, such as:

$$h_{ij} = \Sigma_{m=1}^{M} I[\text{dayOfWeek}[t_m]=i] \wedge I[\text{hourOfDay}[t_m]=j].$$

This histogram can be used to determine derivative histograms. For example, a day of the week histogram may correspond to: $h_j = \Sigma_i h_{ij}$. An hour of the day histogram may correspond to: $h_i = \Sigma_j h_{ij}$. As further examples, one or more histograms may be determined for particular semantic time resolutions in the form of: $h_{ic} = \Sigma_{j \in c} h_{ij}$. Any of various semantic time resolutions may be employed, such as weekdays and weekends, or morning, afternoon, and night. An example of the latter is where C ∈{morning, afternoon, night}, morning={9, 10, 11}, afternoon={12, 13, 14, 15, 16}, and night={21, 22, 23, 24}.

An additional data structure utilized in representing a communication event can comprise the number of distinct time stamps in every calendar week that has at least one time stamp therein, which may be represented as:

$$w_i^j = \|\{m | t_m \text{ is within the } i\text{-th } j \text{ week period}\}\|.$$

As an example, $w_2^3$ can denote the number of distinct time stamps during the 2nd three-week period of available time stamps. $N^{(j)}$ may be utilized to denote the number of j-week time stamps available in the tracked data; for example, $N^{(3)}$ denotes the number of three-week periods available in the time stamps.

Availability engine 280 in conjunction with its subcomponents may generate a confidence score that quantifies a level of certainty that a particular pattern is formed by the historical values in the tracked variable. In the following example, the above principles are applied utilizing Bayesian statistics. In some implementations, a confidence score can be generated for a corresponding tracked variable that is indexed by a temporal interval of varying resolution. For time stamps, examples include Tuesday at 9 AM, a weekday morning, and a Wednesday afternoon. The confidence score may be computed by applying a Dirchlet-multinomial model and computing the posterior predictive distribution of each period histogram. In doing so, a prediction for each bin in a particular histogram may be given by:

$$x_i = \frac{\alpha_0 + h_i}{\sum_{i}^{K}(\alpha_0 + h_i)};$$

where K denotes the number of bins, $\alpha_0$ is a parameter encoding the strength of prior knowledge, and $$i^* = \underset{i}{\text{argmax}}\, x_i.$$

Then, the pattern prediction is the bin of the histogram corresponding to i* and its confidence is given by $x_i^*$. As an example, consider a histogram in which morning=3, afternoon=4, and evening=3. Using $\alpha_0$=10, the pattern prediction is afternoon, and the confidence score is $$\frac{10+4}{(10+3)+(10+4)+(10+3)} = \frac{14}{40} \approx 0.35.$$

In accordance with various implementations, more observations result in an increased confidence score, indicating an increased confidence in the prediction. As an example, consider a histogram in which morning=3000, afternoon=4000, and evening=3000. Using a similar calculation, the confidence score is $$\frac{4010}{10030} \approx 0.4.$$

Also, in some implementations, a confidence score can be generated for a corresponding tracked variable that is indexed by a period and a number of time stamps. Examples include 1 visit to a venue per week, and 3 visit to a venue every 2 weeks. Using a Gaussian posterior, a confidence score may be generated for a pattern for every period resolution, denoted as j. This may be accomplished by employing the formula:

$$\hat{\mu}^{(j)} = \lambda \left( \frac{1}{N^{(j)}} \sum_{i}^{N^{(j)}} w_i^{(j)} \right) + (1-\lambda)\mu_0,$$

$$\text{where } \lambda = \frac{\sigma_0^2}{\frac{\sigma^2}{N^{(j)}} + \sigma_0^2}.$$

In the foregoing, $\sigma^2$ is the sample variance, and $\sigma_0^2$ and $\mu_0$ are parameters to the formula. A confidence score can be computed by taking a fixed interval around the number of time stamps prediction and computing the cumulative density as:

$$\mathit{conf}_j = P(|x - \overline{\mu^{(j)}}| < a) = \int_{\overline{\mu^{(j)}} - a}^{\overline{\mu^{(j)}} + a} \mathcal{N}(x \overline{\mu^{(j)}}, \hat{\sigma}^{(j)}),$$

$$\text{where } \hat{\sigma}^{(j)} = \frac{1}{\frac{N^{(j)}}{\sigma^2} + \frac{1}{\sigma_0^2}}.$$

As an example, consider the following observations: $w_1^{(1)}=10$, $w_2^{(1)}=1$, $w_3^{(1)}=10$, $w_4^{(1)}=0$, $w_1^{(2)}=11$, and $w_2^{(2)}=10$. $N^{(1)}=4$ and $N^{(2)}=2$. Using $\mu_0=1$ and $\sigma_0^2=10$, $\mu^{(1)}=4.075$, and $\mathit{conf}_1=0.25$. Furthermore, $\mu^{(2)}=10.31$ and $\mathit{conf}_2=0.99$. In the foregoing example, although fewer time stamps are available for two week periods, the reduced variance in the user signals results in an increased confidence that a pattern exists.

Having determined that a pattern exists, or that the confidence score for a pattern is sufficiently high (e.g., satisfies a threshold value), historical venue communication trend component 284 may identify that a series of communication records corresponds to an availability pattern for the user. As a further example, historical venue communication trend component 284 may determine that a communication pattern is being practiced by a user where one or more of the confidence scores for one or more tracked variables satisfy a threshold value. In this regard, an interaction of a pattern of communications may be determined as being practiced based on historical venue communication trend component 284 identifying one or more patterns in historical values of one or more tracked variables of the communication records.

In some aspects, patterns of communications may be determined by monitoring one or more variables related to the communications and/or user data associated with those communications. These monitored variables may be determined from the user data described previously as tracked variables or as described in connection to user-data collection component 214. In particular, the variables may be determined from contextual data related to communications and/or user data from other users, such as other users present at the same venues previously, which may be extracted from the user data by historical venue communication trend component 284. Thus, the variables can represent context similarities among multiple communication records. In this way, patterns may be identified by detecting variables in common over multiple records. More specifically, variables associated with a first record may be correlated with variables of a second record to determine a likely pattern. For example, where a first record comprises a user making or receiving no calls on Wednesday evening while at a school, and a second interaction comprises a user visiting the same school on the next Wednesday evening and also making or receiving no calls, then a pattern may be determined that calls are not socially acceptable while at school on Wednesday evening.

In this example, the in-common variables for the two venue interactions include the same venue place (the school), the same day of the week (Wednesday), and the same time (evening).

The historical user communication trend component 286 can analyze communication records for an individual user where a present availability is being determined. The historical user communication trend component 286 can look at a user's communication trends while in different venues or other similar settings. The historical user communication trend component 286 can generate a present availability score. The present availability score is generated by analyzing a user's communication data from a similar context, such as when the user was previously in a venue at a similar time of day. The communication data may be analyzed to find an availability pattern. If the user communicated frequently in a similar context, then the user is likely to be available for communications in the present similar context. The historical user communication trend component 286 can correlate user trends with a venue, time of day, venue and time of day, or other combination of variables.

In one aspect, the historical user communication trend component 286 can generate a communication or contextual sensitivity score that indicates whether or not a user's historical data indicates that the user conforms with the current communication context. For example, a user could conform with the communication context if the user sets his phone on mute and does not make phone calls when other users exhibit a similar pattern while in a venue. On the other hand, if the user is the only person making phone calls and receiving phone calls when the other users in the similar context are not receiving communications, then the user may have a weak correlation to the communication context established by the actions of others. The context confirmation or correlation factor may be used by the present availability component 289 when determining a user's ultimate availability to receive a communication in one or more communication modes. A strong correlation can give more weight to usage data, both present and historical, for others in the final determination. A weak correlation can cause more weight to be given to a user's previous communication records compared to the weight given to others' communication records.

The activity analyzer 288 can analyze a user's present activities on one or more communication devices or through other contextual signals to determine an activity-based communication availability score. In particular, the analyzer 288 can match present activities with previous activity/patterns to develop user availability patterns. For example, the user may not check e-mail or text messages when on a social networking application, but might take a phone call. The patterns can be learned by finding correlations between communication activity and user activities on the device by conducting a statistical analysis of the activity data and cotemporaneous communication records.

In addition to activities on the device, a user's non-computing activity can be an input for the activity analyzer 288. For example, a user's context could be driving in a vehicle, which suggests a non-availability for text messages but availability for phone calls. The previous example is just a general example; a user's historical communication trends within or while driving an automobile may indicate that the user prefers to receive no communications or only urgent communications while driving. Thus, the historical trends may be combined with current activity to determine present availability.

The present availability component 289 can make a final determination about a user's availability at the present time. The present availability component 289 can take as input the output from one or more of the present venue communication state component 282, the historical venue communication trend component 284, the historical user communication trend component 286, and the activity analyzer 288 to make a final determination about a user's availability. The availability analysis provided by the previously mentioned components can be given different weight when determining availability. In one aspect, a machine learning model is used to infer availability based on the inputs received. The machine learning model may be trained using training data that assigns an availability output to various inputs. The actual inputs in a particular situation are effectively analyzed using the model to determine whether a user has availability for one or more modes of communication at the present time. The present availability component 289 can provide an output to the user notification component 291, the originator notification component 292, and the communication setting component 293. Each of these components can take additional actions as described subsequently.

In one aspect, the various inputs of the present availability component 289 and the outputted availability is expressed as a confidence score. A confidence score may correspond to a relative strength of a corresponding modeled pattern appearing in distributions of one or more values of tracked variables of communication/availability patterns. The confidence score may be impacted by various factors, such as the variance in the patterns, the age of detected communications forming the patterns, and the number of detected communication events forming the patterns. In some cases, where all confidence scores of availability assigned to a communication pattern satisfy their respective threshold values, present availability component 289 may determine that a user is not available to communicate. It should be noted that any combination of the aforementioned threshold values may be the same or different with respect to one another.

In some aspects, confidence scores of availability may be determined by utilizing one or more confidence metrics. In some implementations, confidence metrics increase confidence scores based on detected repetitions or iterations of availability-related interactions over time as indicated in patterns formed by the communication events. Confidence scores may be discounted based on lapsed time with respect to one or more of the repetitions or iterations. For example, a confidence score that may have been high in the past may be low in the present based on corresponding user behavior or behaviors having occurred far in the past. As another example, iterations may be phased out from consideration and/or storage over time. In this way, present availability component 289 can adapt to changing lifestyles in which users may alter their interests and behaviors over time, and thus no longer conform to a previous availability pattern.

The predictive availability component 290 can predict when a user will next be available for a communication or a particular communication mode. The predictive availability component 290 can look at communication trends within a venue, a user's communications trends within a time period, and such to detect a pattern of non-communication and when this pattern terminates. For example, a user may have a communication trend that indicates the user does not communicate between 10 PM and 8 AM. The user may be asleep at this time or have otherwise deactivated her communication devices. In any case, the user may have a predicted availability for communication at 8 AM given this pattern.

In one example, the predictive availability component 290 takes venue into consideration as well as the communication records of other users. For example, a communication pattern can be extracted through analysis of the data that indicates very few communications occur between 9 AM and 11 AM while users are at a particular venue. In this case, the predictive availability component 290 may use this pattern to predict user availability at 11 AM.

The predictive availability component 290 can also take calendar entries for a user as well of those for other people in the same venue into consideration. For example, the user may have a calendar entry starting at 9 AM and concluding at 11 AM. While a calendar entry may have no specific information about communication availability, an inference can be made that the user's context will change at 11 AM and that the user may be available for additional forms of communication. In addition to the individual's calendar entry, calendar entries for other people at the venue may be accessed to determine the duration of an ongoing event. In an aspect, the technology can extract calendar information for a variety of users that have agreed to share calendar information. The actual information on the calendar can remain private, but the duration of meetings may be extracted and analyzed in the aggregate to determine when an event ends and when the communication context for people attending the event may change.

The user notification component 291 can manage communication notifications on a user device. The user notification component 291 can present a notification indicating that communications are being diverted or held at the present time. In other words, the notification component 291 can provide a notification on the mobile device that a non-availability state for one or more communication modes is active. For example, the user notification component 291 may receive an indication from the present availability component 289 that the user is not presently available to receive phone calls. The user notification component 291 may generate an icon on the lock screen that indicates phone calls are being diverted to voicemail at the present time. A specific icon may be provided for each communication mode being blocked or just a general icon that indicates general non-availability for all communication modes.

The originator notification component 292 can automatically reply on behalf of the user to an originator of a communication. For example, the originator notification component 292 could automatically reply with a text or e-mail message indicating that the user is presently not available for this mode of communication. The notification message could include an anticipated availability time or other information, such as the user presently is available to receive communications in a different mode. The originator notification component 292 can also transform a communication received in a first mode to a second mode that the user is presently available to receive. For example, the originator notification component 292 could receive a text message and convert that into an audible message automatically that is announced to the user. In one aspect, the originator notification component 292 only performs these tasks after a user's non-availability is inferred.

The communication setting component 293 can manage the communication settings on a computing device in response to the present availability component's determinations. For example, the communications setting component 293 could automatically disable audible notifications for incoming communications. The communication setting component 293 could also automatically reset communication settings to their previous settings upon determining that the user is now available to receive the communications.

In some aspects, communication setting component 293 generates user interface features associated with a notification. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, communication setting component 293 may query the user regarding the relevance, urgency, or user preferences regarding a venue or for handling an information item. Some aspects of communication setting component 293 capture user responses to notifications or user activity associated with notifications and provide this information to the availability engine 280 to form a communication record.

As described previously, in some aspects, a personal assistant service or application operating in conjunction with communication setting component 293 determines when and how to present the notification. In such aspects, the notification content may be understood as a recommendation to the communication setting component 293 (and/or personal assistant service or application) for when and how to present the notification, which may be overridden by the personal assistant app or communication setting component 293.

Further, some aspects of communication setting component 293 include functionality for managing pending notifications for a user and may prioritize which notifications are presented, based on urgency or relevance, user availability, user preferences, or other contextual information. Alternatively, in other aspects, a notifications service or application manages pending notifications for a user and may prioritize which notifications are presented or how information is provided to the user.

It may be appreciated that, in some aspects, a wide variety of information, such as temporal information and/or locational information, may be evaluated to identify sensor data and/or supplement sensor data (e.g., a user's primary calendar may be used to identify conflicts and/or verify activities derived from sensor data; sensor data may be evaluated against real-time data, such as traffic information, weather, or supplemental information, which may include information from the user's social media accounts, family or friends' social media accounts, e-mail, news, and other user data (e.g., crowdsourced data)). In this way, the complementary calendar may be constructed with one or more entries derived from sensor data (e.g., automatically generated entries based upon inferred activities). In an aspect, a complementary calendar may be merged with one or more calendars (e.g., the user's primary calendar, a family calendar, a social network calendar, etc.) to create a shadow calendar comprising at least some of the complementary calendar (e.g., automatically generated entries derived/inferred from sensor data) and at least some of the one or more calendars (e.g., user entries populated within the primary calendar by the user). User availability for scheduling notifications (or otherwise providing an information item) may then be determined based on the calendar information.

Continuing with FIG. 2, some aspects of availability engine 280 use statistics and machine learning techniques. In particular, such techniques may be used to determine pattern information associated with a user, such as communication patterns, user knowledge such as semantic understanding of the user, relevance of venues and information to the user, and urgency. For example, using crowdsourced data, aspects of the technology described herein can learn to associate keywords or other context and information item features with higher levels of relevance or urgency, based on determining how other users respond or react to information items with those features. In one aspect, pattern recognition, fuzzy logic, neural network, finite state machine, support vector machine, clustering, or similar statistics and machine learning techniques are applied.

Example system 200 also includes storage 225. Storage 225 generally stores information including data, computer instructions (e.g., software program instructions, routines, or services), logic, profiles, and/or models used in aspects of the technology described herein. In an aspect, storage 225 comprises a data store (or computer data memory). Further, although depicted as a single data store component, storage 225 may be embodied as one or more data stores or may be in the cloud.

In one aspect, storage 225 stores one or more user profiles 240, an example aspect of which is illustratively provided in FIG. 2. Example user profile 240 may include information associated with a particular user or, in some instances, a category of users, such as users present in the same venue(s). As shown, user profile 240 includes venue data 242 (which may include venue pattern data), venue information source associations 243, user preferences 244, user semantic knowledge 246 (or a user knowledge base), user account(s) and activity data 248, and notification(s) 250. The information stored in user profiles 240 may be available to the routines or other components of example system 200.

As described previously, venue data 242 generally includes information about venues relevant to the user and associated user interactions with venues, such as patterns of venue communications. Information source associations component 243 generally includes the set of one or more sources of information corresponding to the venues. User preferences 244 generally include user settings regarding the importance (or relevance) of specific communications for designated people, specific information sources, thresholds, and/or notification preferences, as described herein. For example, user preferences 244 may store user feedback and settings indicating the level of acceptance for notifications or when and how much to be notified. In some aspects, users can assign constraints or priorities to specific communication modes, time constraints for notifications, or notification preferences, for example.

User semantic knowledge 246 generally comprises a set of information inferred or otherwise determined about the user, and may be embodied as a knowledge base. User information determined from user data (including feedback and other user input) may be stored in user semantic knowledge 246.

User account(s) and activity data 248 generally includes user data collected from user-data collection component 214 (which in some cases may include crowdsourced data that is relevant to the particular user), and may be used for determining semantic knowledge about the user. (In some aspects, user account(s) and activity data 248 includes user semantic knowledge 246.) In particular, user account(s) and activity data 248 can include user data regarding user e-mails, texts, instant messages, calls, and other communications; social network accounts and data, such as news feeds; online activity; and calendars, appointments, or other user data that may be used for determining relevance, urgency, scheduling, contextual information, and/or supplemental information. Aspects of user account(s) and activity data 248 and/or user semantic knowledge 246 may store information across one or more databases, knowledge graphs, or data structures.

Notification(s) 250 generally includes data about pending notifications associated with a user, which may include notification content corresponding to one or more information items. In some aspects, notification(s) 250 includes a schedule associated with a notification, data corresponding to notifications that have not yet been presented to a user, or supplemental content that may not be provided to a user.

(Further, in some aspects, notification(s) 250 may also include information about previously pending notifications.) The notifications could include a to-do list or similar.

Figure 3:
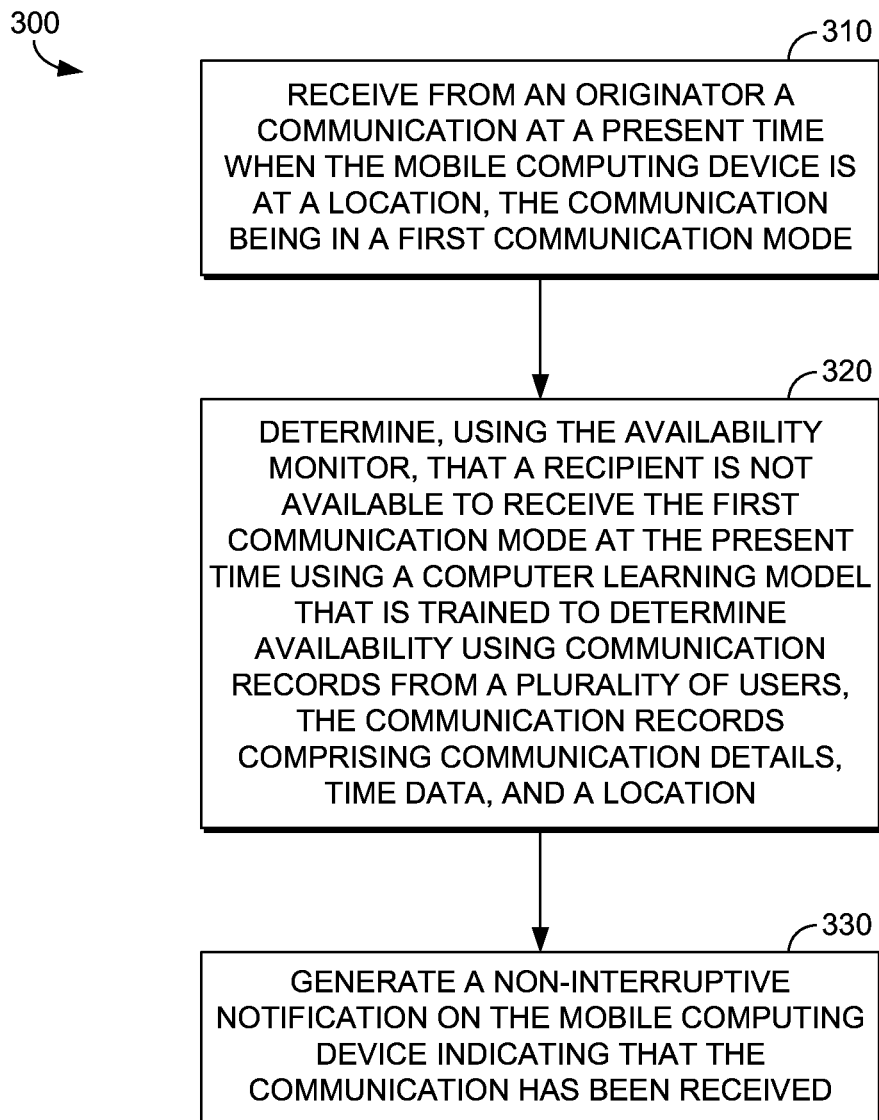
FIGS. 3-5 depict flow diagrams of methods for inferring user availability for a communication, in accordance with an aspect of the technology described herein.

Turning now to FIG. 3, a method 300 of inferring user availability to receive a communication is provided. Method 300 may be performed in a computing environment, such as system 200, described previously. For example, many of the steps in method 300 could be performed by the availability engine 280. The user's availability may be determined for one or more computing devices and for one or more communication modes available on the user's devices. In one aspect, the user does not provide explicit instructions regarding availability. Instead, the user's present context is evaluated to determine whether or not the user is available to receive a communication. When not available, the originator of the communication may receive a notification indicating that the user is not available. Additionally, the notification can include a suggestion to communicate with the user via a second mode of communication that the user is currently available to receive. The notification can also include information about when the user may next be available to receive a communication.

At step 310, a communication is received from an originator at a present time when the mobile computing device is at a location. The communication is in a first communication mode, such as e-mail, text, social media, phone call, etc. The location of the mobile device may be determined using sensor data, such as GPS data, derived from signals received by a GPS receiver. In one aspect, the location is used to associate the mobile device with a venue, such as a home, place of work, restaurant, theater, church, synagogue, etc. The venue can be identified by a computing device that accesses a data store that associates venues with geocodes. Further information about the venue can be accessed from a knowledge base. The knowledge base is a computerized record that describes various entities. As an example, a knowledge base may include a record of what movies are being shown at a theater and when the movies are showing. The knowledge base can assign a venue to a particular category, such as restaurant, movie theater, residents, school, etc. The venue can also be used to look up semantic information about the user. Semantic information includes a user's previous communications or lack thereof while at the venue. The semantic information can include communications received and/or sent while at the venue. The semantic information can also include communication settings, such as muting a ringtone while at the venue.

At step 320, a determination is made, using the availability engine, that a recipient is not available to receive a communication in the first communication mode at the present time using a computer learning model that is trained to determine availability using communication records from a plurality of users. The communication records comprise communication details, time data, and a location for individual communications. The communication records could be for a plurality of users presently in the venue and/or for users that visited the venue previously. The machine learning model could be similar to those described previously with reference to the present venue communication state component 282 and the historical venue communication trend component 284. In one aspect, a further determination is made that the user will be available to receive a communication at a particular time in the future.

At step 330, a non-interruptive notification is generated on the mobile computing device indicating that the communication has been received. In one aspect, the normal notification when the user is available would be an interruptive communication, such as an audible alarm.

In addition to providing a non-interruptive communication instead of an interruptive communication, a notification can be communicated to the originator that the recipient is not presently available for the first communication mode. The notification could indicate that the recipient is presently available to receive a second communication mode. The notification could also indicate that the recipient is to be available to receive a communication in the first communication mode after the point in time.

Figure 4:
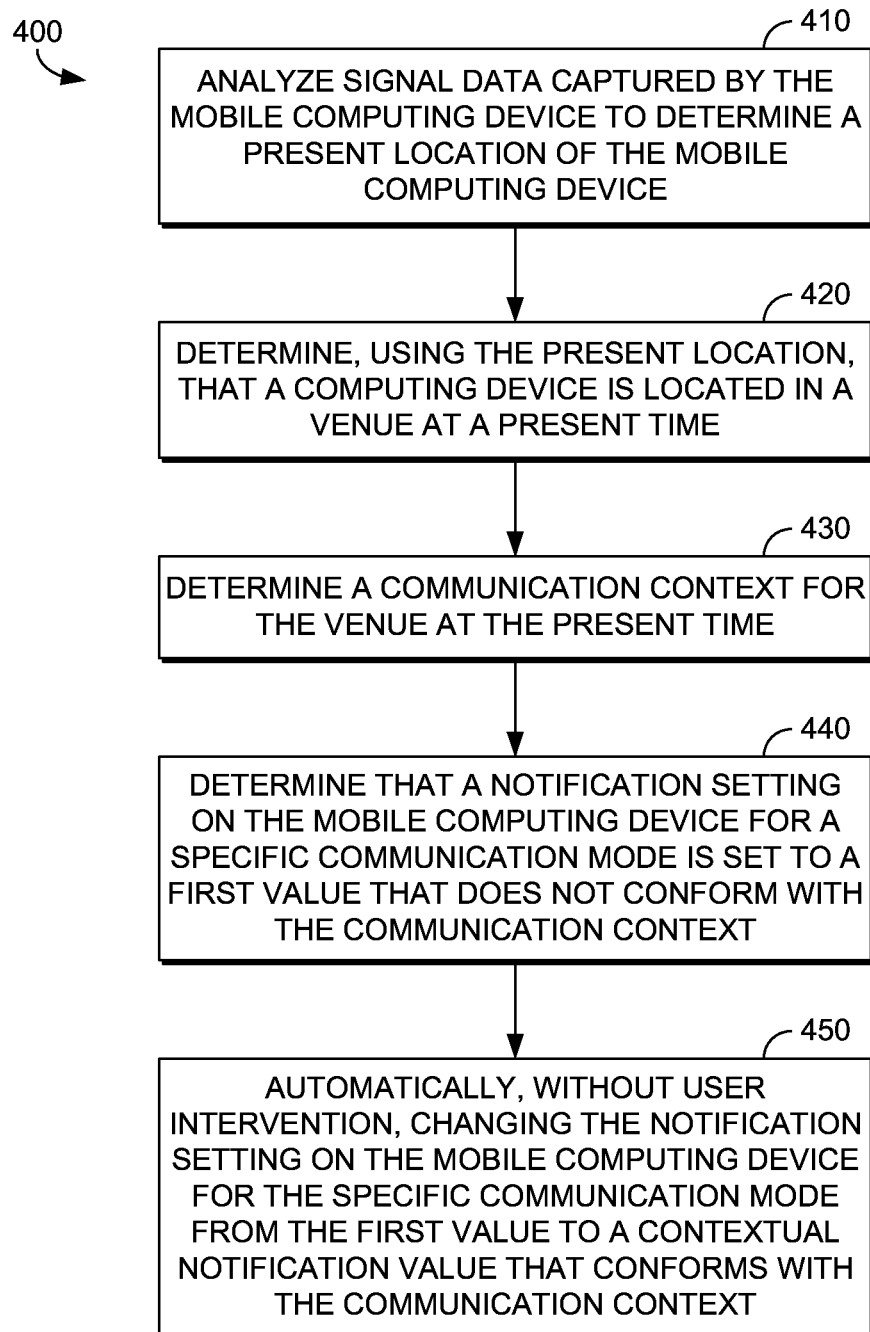

Turning now to FIG. 4, a method 400 for inferring user availability to communicate through a mobile computing device is provided. Method 400 may be performed in a computing environment, such as system 200, described previously. For example, many of the steps in method 400 could be performed by the availability engine 280.

At step 410, signal data captured by the mobile computing device is analyzed to determine a present location of the mobile computing device.

At step 420, using the present location, a computing device is determined to be located in a venue at a present time. In one aspect, device state information for a plurality of devices also located in the venue at the present time is received. The device state information includes a notification status for the specific communication mode.

At step 430, a communication context for the venue at the present time is determined. The communication context can be comprised using the device state information, for example, using a present venue communication state determination generated by component 282. The communication state information can include device settings and recent communication records that can be used to determine the present context.

At step 440, a notification setting on the mobile computing device for a specific communication mode is determined to be set to a first value that does not conform with the communication context.

At step 450, the notification setting on the mobile computing device for the specific communication mode is changed automatically from the first value to a contextual notification value that conforms with the communication context.

The method can comprise determining that the user has departed from the venue and automatically resetting the notification setting on the mobile computing device to the first value.

Figure 5:
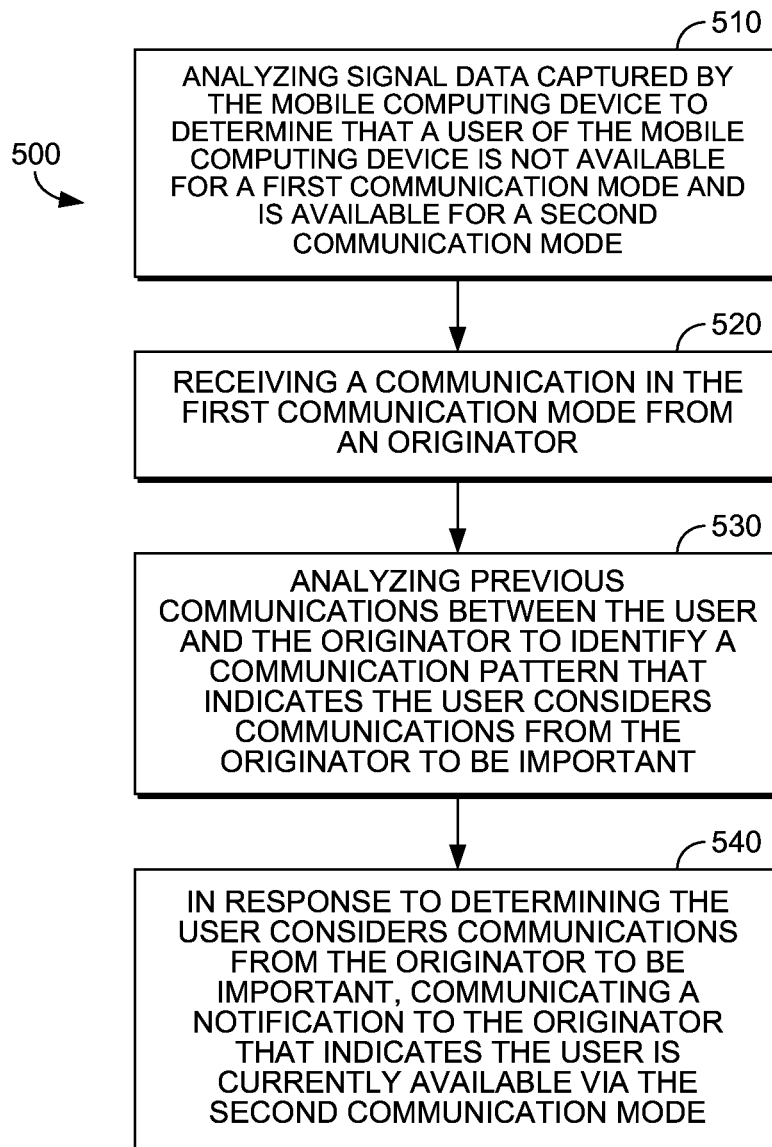

Turning now to FIG. 5, a method 500 of inferring availability to receive a communication is provided. Method 500 may be performed in a computing environment, such as system 200, described previously. For example, many of the steps in method 500 could be performed by the availability engine 280.

At step 510, signal data captured by the mobile computing device is analyzed to determine that a user of the mobile computing device is not available for a first communication mode and is available for a second communication mode.

At step 520, a communication in the first communication mode is received from an originator.

At step 530, previous communications between the user and the originator are analyzed to identify a communication pattern that indicates the user considers communications from the originator to be important.

At step 540, in response to determining the user considers communications from the originator to be important, a notification is communicated to the originator that indicates the user is currently available via the second communication mode.

Accordingly, we have described various aspects of technology directed to systems and methods for providing personalized information to a user from venues of interest to the user. It is understood that various features, sub-combinations, and modifications of the aspects described herein are of utility and may be employed in other aspects without reference to other features or sub-combinations. Moreover, the order and sequences of steps shown in the example methods 300, 400, and 500 are not meant to limit the scope of the technology described herein in any way, and in fact, the steps may occur in a variety of different sequences within aspects hereof. Such variations and combinations thereof are also contemplated to be within the scope of the technology described herein.

Exemplary Operating Environment

Figure 6:
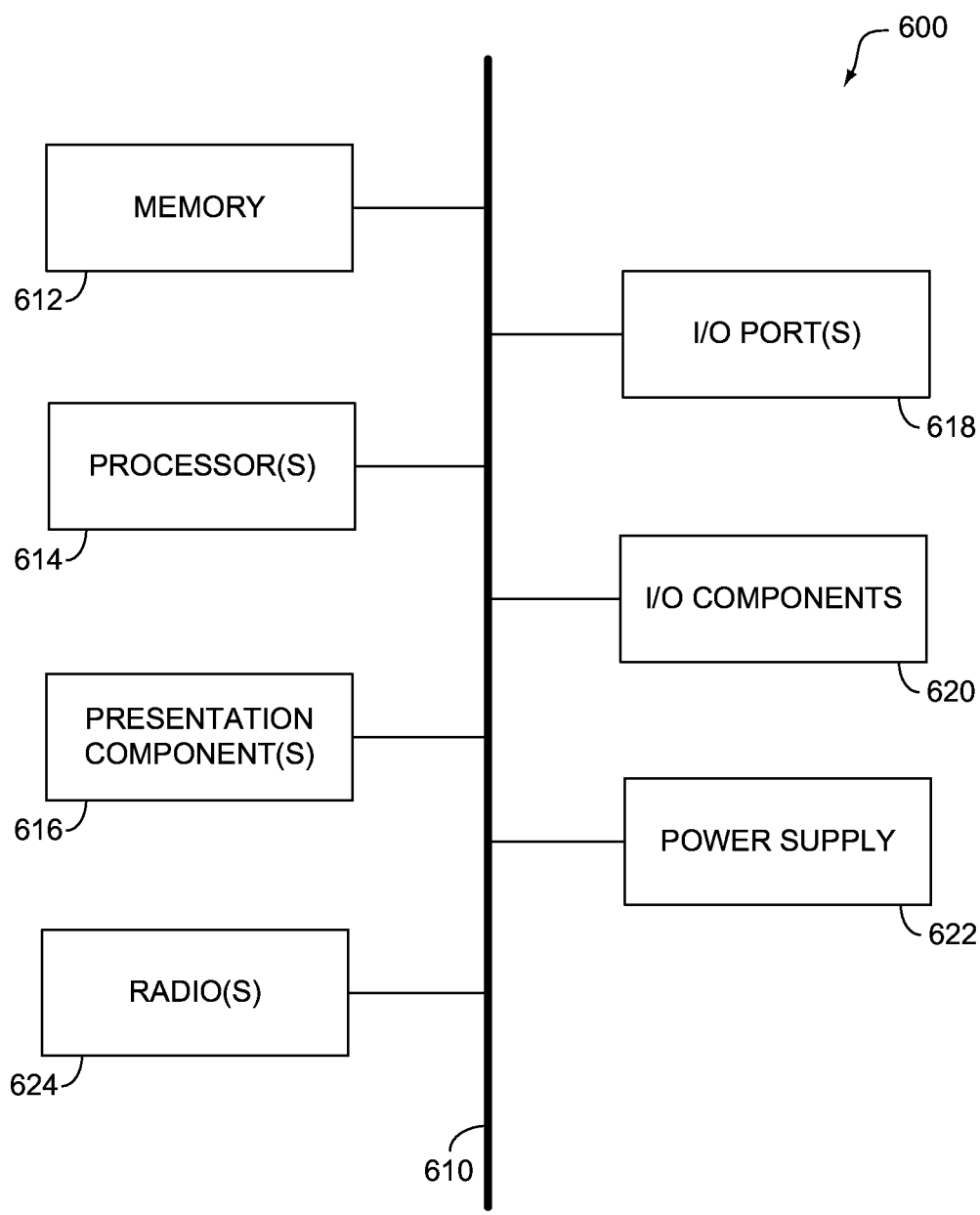
FIG. 6 is a block diagram of an exemplary computing environment suitable for use in implementing an aspect of the technology described herein.

Referring to the drawings in general, and to FIG. 6 in particular, an exemplary operating environment for implementing aspects of the technology described herein is shown and designated generally as computing device 600. Computing device 600 is but one example of a suitable computing environment and is not intended to suggest any limitation as to the scope of use of the technology described herein. Neither should the computing device 600 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including data center based servers, handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 6, computing device 600 includes a bus 610 that directly or indirectly couples the following devices: memory 612, one or more processors 614, one or more presentation components 616, input/output (I/O) ports 618, I/O components 620, and an illustrative power supply 622. Bus 610 represents what may be one or more busses (such as an address bus, data bus, or a combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer storage media in the form of volatile and/or nonvolatile memory. The memory 612 may be removable, non-removable, or a combination thereof. Exemplary memory includes solid-state memory, hard drives, optical-disc drives, etc. Computing device 600 includes one or more processors 614 that read data from various entities such as bus 610, memory 612, or I/O components 620. Presentation component(s) 616 present data indications to a user or other device. Exemplary presentation components 616 include a display device, speaker, printing component, vibrating component, etc. I/O ports 618 allow computing device 600 to be logically coupled to other devices, including I/O components 620, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 614 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 600. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

A computing device may include a radio 624. The radio 624 transmits and receives radio communications. The computing device may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A mobile computing device comprising:
   one or more sensors configured to provide sensor data, including at least location data for the mobile computing device;
   one or more processors;
   one or more computer storage media storing computer-useable instructions that, when used by the one or more processors, implement an availability engine that detects an availability status based at least in part on the sensor data; and
   one or more computer storage media storing computer-useable instructions that, when used by the one or more processors, cause the one or more processors to perform operations comprising:
      receiving, from an originator, a communication at a present time when the mobile computing device is at a location, the communication being in a first communication mode,
      determining, using the availability engine, that a recipient is not available to receive the first communication mode at the present time, but is available to receive a second communication mode, said determining comprising using a computer learning model that is trained to determine availability using communication records from a plurality of users, the communication records comprising communication details, time data, and location data, and
      responsive to said determining, automatically transforming the communication to the second communication mode and providing the communication to the recipient in the second communication mode.

2. The mobile computing device of claim 1, wherein the first communication mode comprises voice-based messaging and the second communication mode comprises text-based messaging.

3. The mobile computing device of claim 1, wherein the first communication mode comprises text-based messaging and the second communication mode comprises voice-based messaging.

4. The mobile computing device of claim 1, further comprising communicating a notification to the originator that the recipient is not presently available for the first communication mode.

5. The mobile computing device of claim 4, wherein the notification to the originator indicates that the recipient is available via the second communication mode.

6. The mobile computing device of claim 4, further comprising determining that the recipient is next going to be available via the first communication mode after a future point in time by inputting the location and the present time into the computer learning model.

7. The mobile computing device of claim 6, wherein the notification to the originator indicates that the recipient is to be available via the first communication mode after the future point in time.

8. The mobile computing device of claim 1, wherein the operations further comprise determining a venue associated with the location and a venue category for the venue using a knowledge base and inputting the venue category into the computer learning model.

9. One or more computer-storage media having computer-executable instructions embodied thereon which, when executed by one or more processors, perform a method of providing communications to a user of a mobile computing device, the method comprising:
   receiving, from an originator, a communication at a present time when the mobile computing device is at a location, the communication being in a first communication mode;
   determining that the user is not available to receive the first communication mode at the present time, but is available to receive a second communication mode, said determining based at least in part on sensor data comprising at least location data for the mobile computing device, and said determining comprising using a computer learning model that is trained to determine availability using communication records from a plurality of users, the communication records comprising communication details, time data, and location data; and responsive to said determining, automatically transforming the communication to the second communication mode and providing the communication to the user via the second communication mode.

10. The one or more computer-storage media of claim 9, wherein the first communication mode comprises voice-based messaging and the second communication mode comprises text-based messaging.

11. The one or more computer-storage media of claim 9, wherein the first communication mode comprises text-based messaging and the second communication mode comprises voice-based messaging.

12. The one or more computer-storage media of claim 9, further comprising communicating a notification to the originator that the user is not presently available for the first communication mode, but is available via the second communication mode.

13. A method of providing communications to a user of a mobile computing device, the method comprising:

receiving, from an originator, a communication at a present time when the mobile computing device is at a location, the communication being in a first communication mode;

determining that the user is not available to receive the first communication mode at the present time, but is available to receive a second communication mode, said determining based at least in part on sensor data comprising at least location data for the mobile computing device, and said determining comprising using a computer learning model that is trained to determine availability using communication records from a plurality of users, the communication records comprising communication details, time data, and location data; and responsive to said determining, automatically transforming the communication to the second communication mode and providing the communication to the user via the second communication mode.

14. The method of claim 13, wherein the first communication mode comprises voice-based messaging and the second communication mode comprises text-based messaging.

15. The method of claim 13, wherein the first communication mode comprises text-based messaging and the second communication mode comprises voice-based messaging.

16. The method of claim 13, further comprising communicating a notification to the originator that the user is not presently available for the first communication mode.

17. The method of claim 16, wherein the notification to the originator indicates that the user is available via the second communication mode.

18. The method of claim 16, further comprising determining that the user is next going to be available via the first communication mode after a future point in time by inputting the location and the present time into the computer learning model.

19. The method of claim 18, wherein the notification to the originator indicates that the user is to be available via the first communication mode after the future point in time.

20. The method of claim 13, further comprising determining a venue associated with the location and a venue category for the venue using a knowledge base and inputting the venue category into the computer learning model.

* * * * *